United States Patent
Seah et al.

(10) Patent No.: US 8,576,113 B1
(45) Date of Patent: Nov. 5, 2013

(54) RUNWAY IDENTIFICATION SYSTEM AND METHOD

(75) Inventors: Kirschen A. Seah, Cedar Rapids, IA (US); Jeffery A. Finley, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 351 days.

(21) Appl. No.: 12/883,061

(22) Filed: Sep. 15, 2010

(51) Int. Cl.
*G01S 13/76* (2006.01)

(52) U.S. Cl.
USPC .............................................. 342/33; 342/36

(58) Field of Classification Search
USPC ...................................... 342/33–36
See application file for complete search history.

(56) References Cited

U.S. PATENT DOCUMENTS

| | | | | |
|---|---|---|---|---|
| 2,178,237 A | * | 10/1939 | Linder | 342/120 |
| 2,555,101 A | * | 5/1951 | Alvarez et al. | 342/34 |
| 2,585,855 A | * | 2/1952 | Sherwin et al. | 342/34 |
| 2,602,850 A | * | 7/1952 | Cline | 340/951 |
| 2,989,727 A | * | 6/1961 | Germeshausen | 340/953 |
| 3,134,975 A | * | 5/1964 | Goodman | 342/136 |
| 3,143,736 A | | 8/1964 | Midlock | 342/171 |
| 3,177,484 A | * | 4/1965 | Case, Jr. et al. | 342/33 |
| 3,375,353 A | * | 3/1968 | Rossoff et al. | 342/180 |
| 3,403,254 A | * | 9/1968 | Campanella | 250/395 |
| 3,415,946 A | * | 12/1968 | Bedford, Jr. | 348/123 |
| 3,716,860 A | * | 2/1973 | Bechtel | 342/33 |
| 3,729,737 A | * | 4/1973 | Asam | 342/33 |
| 3,878,506 A | | 4/1975 | Young | |
| 3,882,381 A | | 5/1975 | Gregory | |
| 3,939,474 A | | 2/1976 | Coleman et al. | |
| 3,971,025 A | | 7/1976 | Levine | |
| 4,042,822 A | | 8/1977 | Brandewie et al. | |
| 4,088,996 A | | 5/1978 | Hooker, Jr. | |
| 4,092,644 A | | 5/1978 | Hodge | |
| 4,101,893 A | | 7/1978 | Lewis | |
| 4,103,300 A | | 7/1978 | Gendreu et al. | |
| 4,137,530 A | | 1/1979 | Hooker, Jr. | |
| 4,219,818 A | | 8/1980 | Mansur, Jr. | |
| 4,283,725 A | * | 8/1981 | Chisholm | 342/174 |
| 4,418,349 A | | 11/1983 | Hofgen et al. | |
| 4,568,938 A | | 2/1986 | Ubriaco | |
| 4,635,064 A | * | 1/1987 | Chisholm | 342/408 |
| 4,698,636 A | * | 10/1987 | Marlow et al. | 342/104 |
| 4,717,917 A | | 1/1988 | Alitz | |
| 4,814,729 A | | 3/1989 | Becker | |
| 4,884,077 A | | 11/1989 | Landt | |
| 4,952,941 A | | 8/1990 | Landt | |
| 5,047,775 A | | 9/1991 | Alitz | |
| 5,049,886 A | | 9/1991 | Seitz et al. | |
| 5,053,773 A | | 10/1991 | Mosinski | |
| 5,132,689 A | | 7/1992 | Van Wyk | |
| 5,198,828 A | | 3/1993 | West et al. | |
| 5,268,698 A | | 12/1993 | Smith et al. | |
| 5,323,223 A | | 6/1994 | Hayes | |
| 5,374,932 A | * | 12/1994 | Wyschogrod et al. | 342/36 |
| 5,400,031 A | * | 3/1995 | Fitts | 342/36 |

(Continued)

*Primary Examiner* — John B Sotomayor
(74) *Attorney, Agent, or Firm* — Donna P. Suchy; Daniel M. Barbieri (57) ABSTRACT

A runway identification system and method utilizes a set of (reflectors or sources). The reflectors or sources can be located in proximity to the end of runway. The method receives electromagnetic energy from the reflectors or sources. A runway identification is determined from the electromagnetic energy. The runway identification can be displayed on a display in the aircraft. The reflectors can be corner reflectors, laser reflectors or other reflective optics.

20 Claims, 6 Drawing Sheets

(56) References Cited

U.S. PATENT DOCUMENTS

| | | | |
|---|---|---|---|
| 5,459,468 A | 10/1995 | Hartal | |
| 5,481,268 A | 1/1996 | Higgins | |
| 5,483,240 A | 1/1996 | Hsu et al. | |
| 5,517,197 A | 5/1996 | Algeo et al. | |
| 5,629,691 A * | 5/1997 | Jain | 340/961 |
| 5,719,567 A * | 2/1998 | Norris | 340/953 |
| 5,736,955 A * | 4/1998 | Roif | 342/33 |
| 6,185,486 B1 | 2/2001 | Labounsky et al. | |
| 6,201,494 B1 | 3/2001 | Kronfeld | |
| 6,208,284 B1 | 3/2001 | Woodell et al. | |
| 6,282,487 B1 | 8/2001 | Shiomi et al. | |
| 6,311,108 B1 * | 10/2001 | Ammar et al. | 701/16 |
| 6,388,607 B1 | 5/2002 | Woodell | |
| 6,424,288 B1 | 7/2002 | Woodell | |
| 6,441,773 B1 | 8/2002 | Kelly et al. | |
| 6,448,922 B1 | 9/2002 | Kelly | |
| 6,462,697 B1 | 10/2002 | Klamer et al. | |
| 6,512,476 B1 | 1/2003 | Woodell | |
| 6,549,161 B1 | 4/2003 | Woodell | |
| 6,603,425 B1 | 8/2003 | Woodell | |
| 6,606,035 B2 | 8/2003 | Kapadia et al. | |
| 6,650,275 B1 | 11/2003 | Kelly et al. | |
| 6,741,203 B1 | 5/2004 | Woodell | |
| 6,741,208 B1 | 5/2004 | West et al. | |
| 6,744,408 B1 | 6/2004 | Stockmaster | |
| 6,947,742 B1 * | 9/2005 | Corrigan | 455/431 |
| 6,950,037 B1 | 9/2005 | Clavier et al. | |
| 7,109,912 B1 | 9/2006 | Paramore et al. | |
| 7,109,913 B1 | 9/2006 | Paramore et al. | |
| 7,129,885 B1 | 10/2006 | Woodell et al. | |
| 7,158,072 B1 | 1/2007 | Venkatachalam et al. | |
| 7,242,343 B1 | 7/2007 | Woodell | |
| 7,579,978 B1 * | 8/2009 | Finley | 342/33 |
| 7,587,278 B2 | 9/2009 | Poe et al. | |
| 7,783,427 B1 * | 8/2010 | Woodell et al. | 701/301 |
| 7,898,463 B1 * | 3/2011 | Mueller et al. | 342/33 |
| 8,159,369 B1 * | 4/2012 | Koenigs et al. | 340/963 |
| 2002/0105432 A1 * | 8/2002 | Pederson et al. | 340/815.45 |
| 2009/0043433 A1 * | 2/2009 | Markiton et al. | 701/15 |
| 2009/0219189 A1 * | 9/2009 | Bateman et al. | 342/30 |

\* cited by examiner

RUNWAY IDENTIFICATION SYSTEM AND METHOD

RELATED APPARATUS

The present application is related to the U.S. application Ser. No. 11/838,135, filed Aug. 13, 2007, entitled, "Runway Identification System Via Radar Receiver," assigned to the Assignee of the present application.

BACKGROUND

The present disclosure relates generally to the field of aviation. Specifically, the present disclosure relates to a system and method for runway identification.

Pilots generally visually determine that their aircraft is lined up to the appropriate runway during approach or landing. The runway has an identifier unique to a particular runway. The runway identifier is generally a number representing the longitudinal direction of the runway or runway heading. For example, a runway having its length disposed in an east to west direction has the number "27" displayed on the east end of the runway and the number "09" disposed on the west end of the runway. Generally, the number is disposed on the centerline of the runway and is set to a value of 1/10 the magnetic azimuth direction or heading of the runway. The numbers are generally two digit numbers from 01 to 36. Aircraft generally approach the closest end of the runway at the direction specified by the runway identifier. If the airport includes more than one runway disposed in parallel, the runway identifier includes a center, left or right designator (e.g., 09L, 09R, 09C).

A system that is configured to provide rapid runway identification would be advantageous. Rapid runway identification is particularly advantageous during low visibility conditions, such as when an aircraft breaks out of the clouds during landing.

What is needed is a runway identification system configured to provide runway identification in an aircraft landing situation. Further, there is a need for an inexpensive runway identification system. Further, there is a need for a runway identification system that does not require additional equipment aboard the aircraft. Further still, there is a need for a runway determination system and method that provides automated runway identification. Yet further, there is a need for a system and method of rapid runway identification that uses an existing aircraft sensor, such as, a weather radar system.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to a runway identification system. The runway identification system includes a weather radar system. The weather radar system is configured to receive radar returns. The radar return is processed to determine a runway identification based upon a reflection from a set of reflectors.

Another exemplary embodiment relates to a method. The method provides runway identification utilizing a set of corner reflectors located in proximity to an end of a runway. The method includes receiving electromagnetic returns from a beam directed toward the set corner reflectors. The method further includes determining a runway identification from the electromagnetic returns. The method further includes displaying the runway identification.

Another exemplary embodiment relates to a runway identification system for an airport including a runway. The runway identification system includes a set of runway corner reflectors. The set of runway corner reflectors is configured to reflect a radar beam from an aircraft. The beam is reflected to indicate a code representing a identification of the runway.

BRIEF DESCRIPTION OF THE DRAWINGS

The disclosure will become more fully understood from the following detailed description, taken in conjunction with the accompanying drawings, wherein like numerals denote like elements.

The disclosure will become more fully understood from the following detailed description, taken in conjunction with the accompanying drawings.

DETAILED DESCRIPTION OF THE EXEMPLARY EMBODIMENTS

Referring generally to the figures, systems and methods for runway identification with an aircraft-mounted sensor system is described. In a preferred embodiment, an avionic radar on-board an aircraft (e.g., a weather radar system) is generally configured to project radar beams and to receive radar returns relating to the projected radar beams. Using data from the radar returns, the radar system is configured to determine identification of the runway. Although runway identification is described below using a weather radar system, the present invention is not limited to such an embodiment unless specifically recited in the claims. Various types of electromagnetic sources and sensors can be utilized without departing from the scope of the invention.

Figure 1:
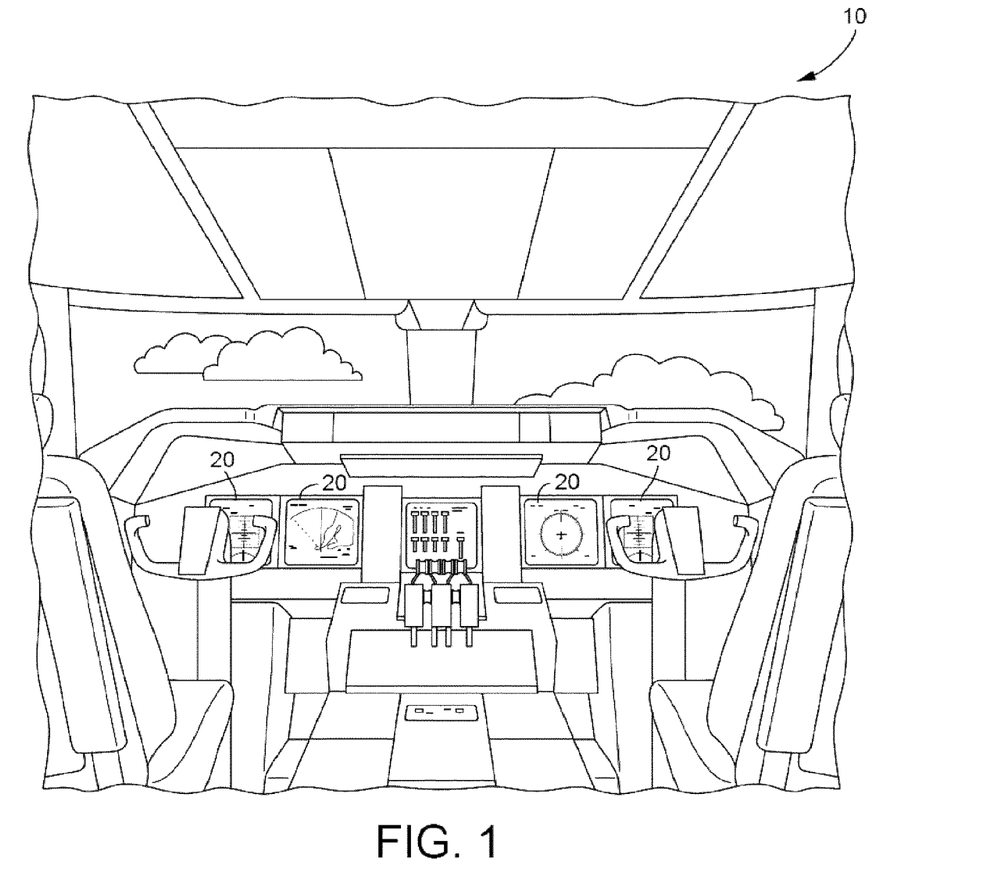
FIG. 1 is a perspective view schematic illustration of an aircraft control center, according to an exemplary embodiment.

Referring now to FIG. 1, an illustration of the control center, or cockpit of an aircraft 10 is shown, according to an exemplary embodiment. Aircraft 10 includes flight displays 20 which are generally used to increase visual range and to enhance decision-making abilities. In an exemplary embodiment, flight displays 20 display information in response to a sensor (e.g. radar system, such as, a weather radar system of aircraft 10). For example, flight displays 20 may provide a top-down view, a horizontal view, or any other view of weather and/or terrain detected by a radar system on the aircraft.

In a preferred embodiment, displays 20 provide an indication of runway identification as determined from a sensor. Runway identification is preferably provided during approach.

The views of weather and/or terrain may include monochrome or color graphical representations of the weather and/or the terrain on displays 20. Graphical representations of weather or terrain may include an indication of altitude of those objects or the altitude relative to the aircraft. Runway identification can be provided via a text or graphical image. In a synthetic vision system, a HUD system, an enhanced vision system, or other display system, the runway identification can be provided on a graphical depiction of the runway. Aircraft 10 may further include terrain awareness and warning system (TAWS), user interface elements (flashing lights, displays, display elements on a weather radar display, display elements on a terrain display, audio alerting devices, etc.) configured to warn the pilot of potentially threatening terrain features. The TAWS system may be configured to, for example, give the pilots of the aircraft a "pull up" indication (e.g., audibly, visually, etc.) when terrain is detected within an altitude of danger to the aircraft. The runway identification can be provided on the TAWS screen.

Figure 2:
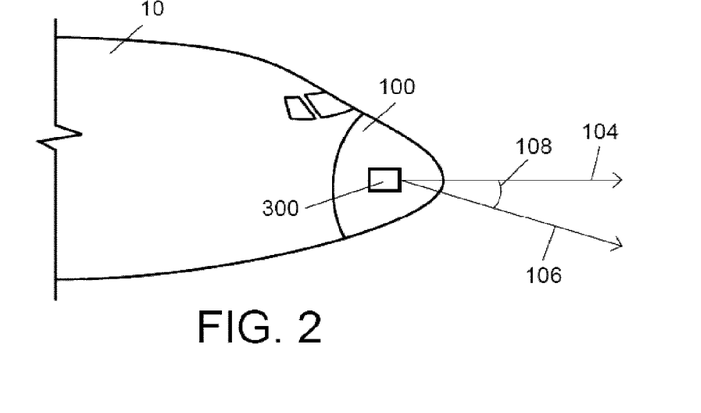
FIG. 2 is a schematic planar side view illustration of the nose of an aircraft including a radar system, according to an exemplary embodiment.

In FIG. 2, the front of aircraft 10 is shown including the control center and a nose 100, according to an exemplary embodiment. According to a preferred embodiment, a radar system 300 (e.g., Multiscan® system or monopulse radar system) is generally located within nose 100 of aircraft 10 or within the aircraft control center. According to various exemplary embodiments, radar system 300 may be located on the top of the aircraft or on the tail of the aircraft instead. Radar system 300 may include or be coupled to an antenna system. A variety of different antennas or radar systems may be used with the present invention (e.g., a split aperture antenna, a monopulse antenna, a sequential lobbing antenna, etc.).

Returns from beams 106 at different tilt angles 108 with respect to a reference 104 (e.g., representing a 0 degree tilt angle) can be electronically merged to form a composite image for display on an electronic display 20 shown, for example, in FIG. 1. Returns can also be processed to, for example, distinguish between terrain and weather, to determine the height of terrain, or to determine the height of weather. Radar system 300 can be a WXR-2100 MultiScan™ radar system or similar system manufactured by Rockwell Collins, Inc. configured for runway identification as described herein in accordance with a preferred embodiment. According to other embodiments, radar system 300 may be an RDR-4000 system or similar system manufactured by Honeywell International, Inc. configured for runway identification as described herein. Alternatively, system 300 can be a non-weather radar system or be a non-radar sensor.

Figure 3:
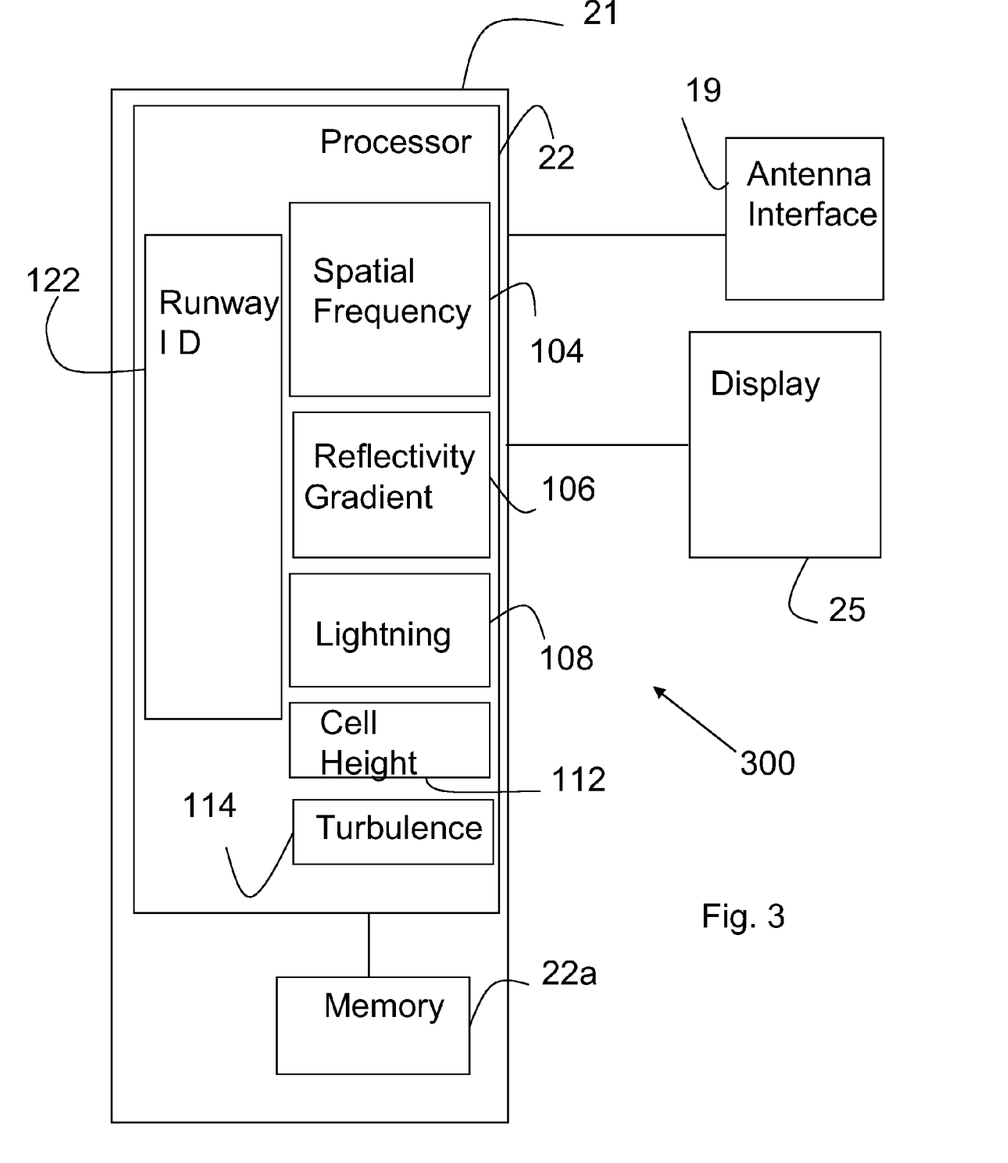
FIG. 3 is a general block diagram of a weather radar system configured for runway identification, according to an exemplary embodiment.

Referring to FIG. 3, a block diagram of a weather radar system 300 is shown, according to an exemplary embodiment. Weather radar system 300 includes a weather radar antenna connected (e.g., directly, indirectly) to an antenna interface 19. An antenna controller and receiver/transmitter circuit may be used to move the antenna and include any number of mechanical or electrical circuitry components or modules for steering a radar beam. For example, such a circuit may be configured to mechanically tilt the antenna in a first direction while mechanically rotating the antenna in a second direction. In other embodiments, a radar beam may be electronically swept along a first axis and mechanically swept along a second axis. In yet other embodiments, the radar beam may be entirely electronically steered (e.g., by electronically adjusting the phase of signals provided from adjacent antenna apertures, etc.). The circuit may be configured to conduct the actual signal generation that results in a radar beam being provided from the weather radar antenna and to conduct the reception of returns received at the antenna. Radar return data is provided to a hardware platform 21 and specifically to a processor or processing electronics 22 for processing. For example, processing electronics 22 can be configured to interpret the returns for display on a display 25 or one or more of displays 20. Processing electronics 22 are preferably configured via software to perform the operations described herein. Electronics 22 can be connected to aircraft sensors which may generally include any number of sensors configured to provide data to processing electronics 22.

The exemplary WXR-2100 MULTISCAN Weather Radar System is capable of operating in an automatic multiscan mode with processor electronics 22 controlling the weather radar system gain and antenna tilt functions over multiple tilt settings and storing the individual scan data in a memory 22a. This scan data is continually refreshed and corrected in the memory 22a for aircraft motion by processor 22. The data sent to display 25 is a composite of multiple scans that have been processed to remove ground clutter and refine the image. This operation optimizes the display images shown to the flight crew by showing short, mid, and long range weather targets. Exemplary weather radar operation is described in U.S. Pat. No. 6,424,288 "Multi-Sweep Method and System for Detecting and Displaying Weather Information on a Weather Radar System" by Daniel L. Woodell and U.S. Pat. No. 6,603,425 "Method and System for Suppressing Ground Clutter Returns on an Airborne Weather Radar" by Daniel L. Woodell, both patents assigned to the assignee of the present application, and incorporated herein by reference.

The operational details, thresholds, architecture, and processes of aircraft 10 are not described in a limiting fashion and are provided as exemplary information. Aircraft 10 can include any type of single beam, multibeam or volumetric scanning system. Systems and subsystems described as circuits can utilize software to implement some or all of the described functionality.

Weather radar system 300 can include various modules for determining the presence of weather and weather hazards. For example, spatial frequency module 104, a reflectivity gradient module 106, a lightning detection module 108, a cell height module 112, and a turbulence detection module 114 can be included to detect various types of weather and weather hazards by processing weather radar returns from antenna interface 19. In one embodiment, processor or processing electronics 22 includes a runway identification module 122 which advantageously determines altitude of aircraft 10 using data from weather radar returns.

Module 122 advantageously provides an automated system for determining runway identification without requiring additional flight equipment. Module 122 advantageously allows the runway identifier to be known even when visibility of runway 302 is obscured such as by fog or other situations.

Preferably, display 25 is a primary flight display which can provide the runway identifier. Alternatively, display 25 can be a secondary display.

In a preferred embodiment, weather radar system 300 provides a beam toward a set of reflectors on the runway and receives a return from the reflectors to determine the runway identification. Advantageously, module 122 can receive an input associated with a mode of flight or other indication of an approach to a runway and direct a beam toward a runway. Alternatively, module 122 automatically causes system 300 to direct the beam in response to the pilot input. The beam is preferably a relatively narrow scan directed toward the runway along the heading of the aircraft. According to another embodiment, a broad spectrum of returns from beams directed toward the ground can be analyzed to determine if a coded runway identifier is present.

The beam can be a vertical, horizontal, diagonal, or other scanning beam directed toward the runway to strike a set of reflectors. Radar returns from the set of reflectors are received through interface 19 and processed to determine a code associated with the runway identification. Module 122 can determine the presence of the code by determining the range to the set of reflectors and the distance between individual reflectors in the set of reflectors. Determining such range and distance increases the certainty associated with detecting the set of reflectors as opposed to other obstacles.

Generally, the set of reflectors provides a higher energy concentration than ordinary obstacles. The scan is preferably preformed at a relatively short range along the bearing of the aircraft and directed toward ground. A preferred range for the scan may be less than about 2 statute miles. The scan can be preformed as part as a weather radar scan or can be a dedicated scan for sensing the presence of the set of reflectors.

Figure 4:
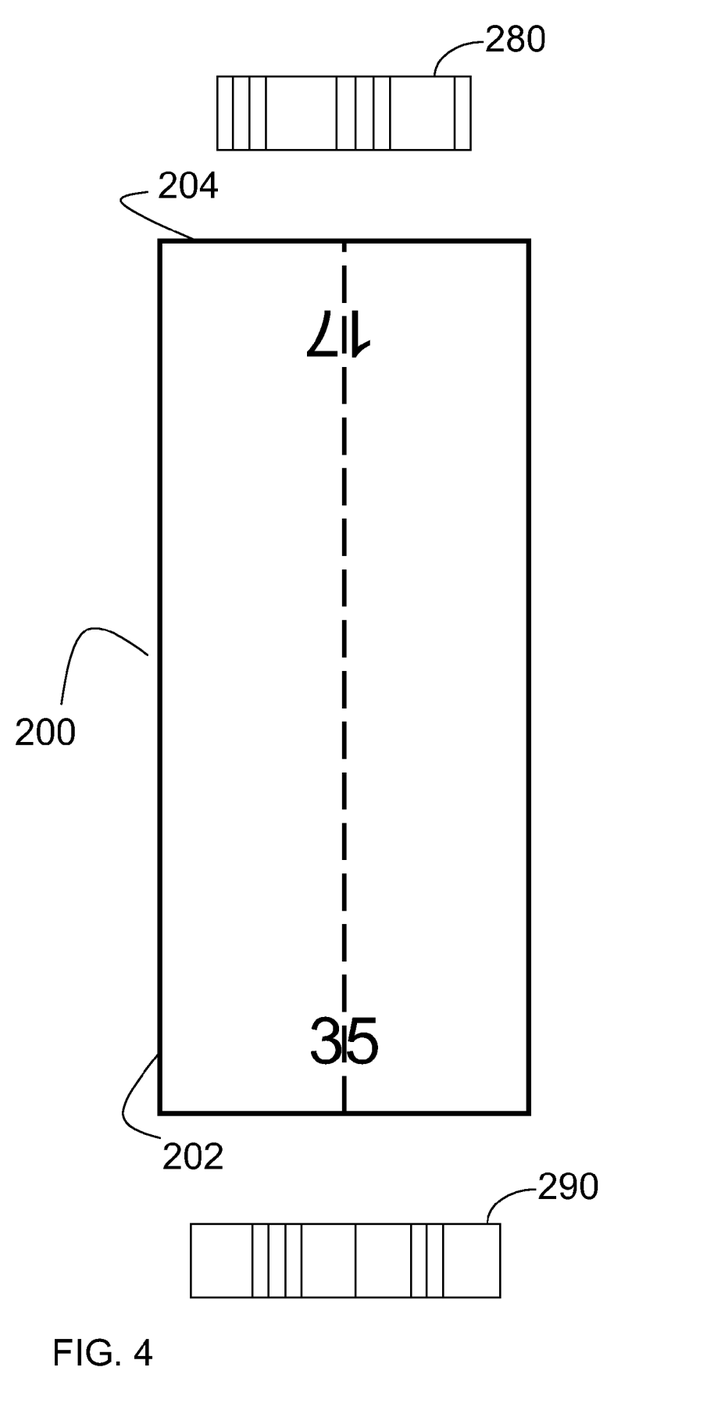
FIG. 4 is a schematic illustration of a runway including radar reflectors for use with the weather radar system of FIG. 3, according to an exemplary embodiment.

With reference to FIG. 4, as aircraft 10 (FIG. 1) approaches runway 200 at a bearing of 350 degrees, radar system 300 scans a set of reflectors 290 disposed at an end 202 of runway 200. In a preferred embodiment as shown in FIG. 4, reflectors 290 are disposed horizontally and the scan is a horizontal scan.

Reflectors 290 preferably reflect electromagnetic energy at a high gain with respect to ground and other obstacles so that runway identification module 122 can determine symbols or bits associated with the set of reflectors 290. The symbols or bits make up a code associated with the runway identification "35". Runway identification "35" is also visually provided at an end 202 of the runway.

Preferably, a set of reflectors 280 is similarly provided at an end 204 of runway 200. Reflectors 280 and 290 can be provided in front of runway 200, off to the side of runway 202 or in any location in which scanning reflectors 290 is possible as aircraft 10 approaches runway 200. Set of reflectors 280 provides a code of "17" associated with 170 degree runway heading for runway 200.

As shown in FIG. 4, large blocks represent a bit value of 1, and small blocks represent a bit value of 0. As shown in the embodiment in FIG. 4, a nine bit word is utilized to represent runway heading. Generally, the runway heading information is provided in the first portion of six most significant bits. A second portion of the next two most significant bits can represent no, left, right, or center runway position. The last bit can represent a parity bit. In one embodiment, odd parity checking is utilized in which an odd number of bits having values of 1 is represented as the least significant bit having a value of 1.

As show, in the example in FIG. 4, runway 35 is represented by a 6 bit number representing the number 35 (100011), a 2 bit number representing no runway position (00) and a final bit representing odd parity (1). Runway 17 is similarly represented by a 6 bit number representing the number 17 (010001) followed by a 2-bit number representing no runway position (00) and a final bit representing even parity (0). Smaller bit words could be utilized if less heading numbers are required.

Alternatively, a preamble can be provided before the heading bits to ensure that the radar beam receives the entire bit code and has an indication when to begin the runway identification portion of the coded message. Fore example, a preamble code of 101 can be provided as the most significant bits. The use of preamble bits can be used to assist threshold determination of zero and one bit levels.

Figure 5:
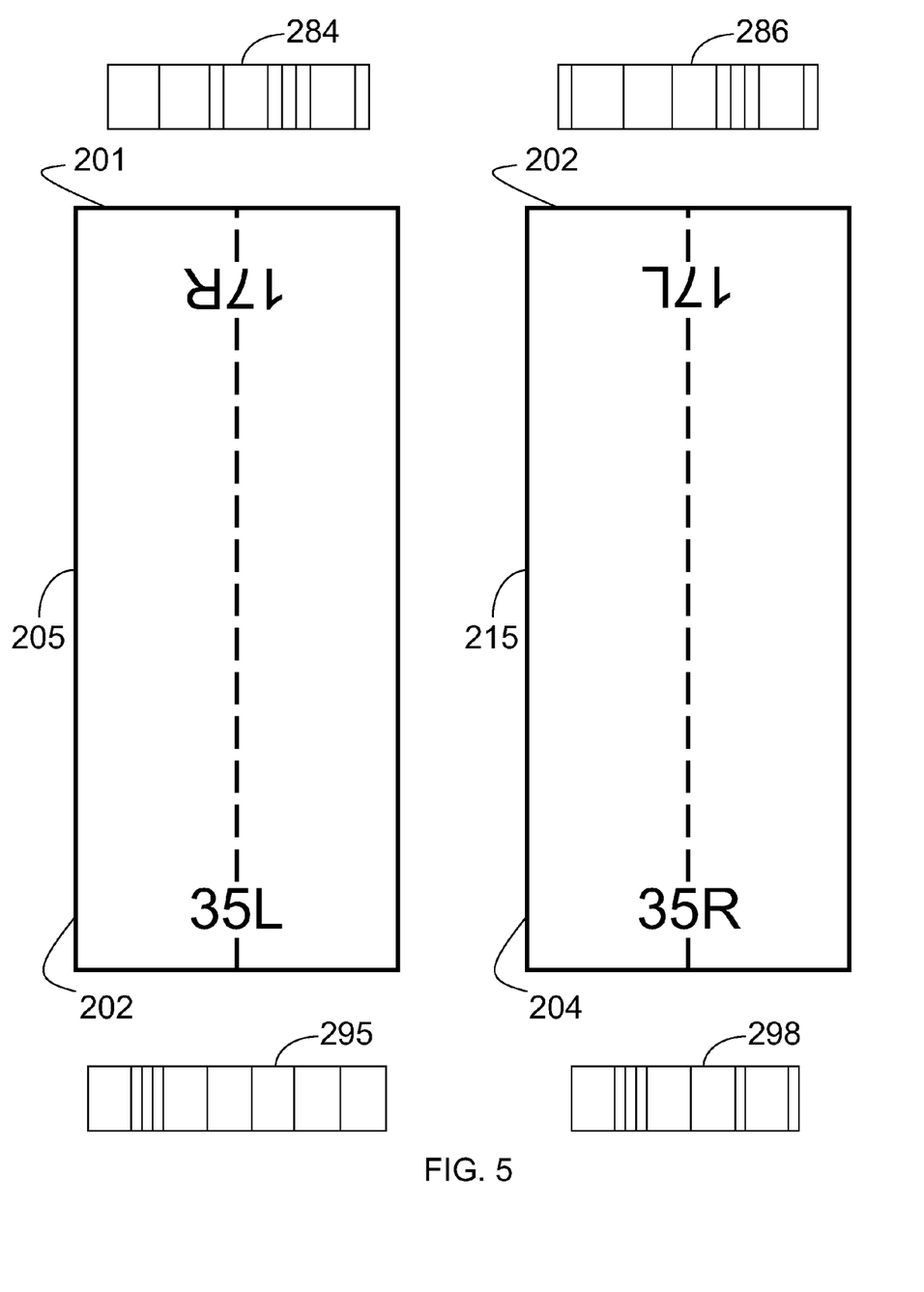
FIG. 5 is schematic illustration of a pair of runways including radar reflectors for use with the weather radar system illustrated in FIG. 3 in accordance with another exemplary embodiment.

With reference to FIG. 5, an airport can include a runway 205 and a runway 215 disposed in a parallel fashion. A set of reflectors 295 and 298 both include a bit pattern for runway designation "35" However, reflectors 295 for runway 205 includes a 2-bit pattern for a left designation (11) to indicate "35L," and reflectors 298 includes a right designation (01) to indicate "35R" for runway 215. Similarly, set of reflectors 284 includes a right designation (01) to indicate "17R" for runway 205 and reflectors 286 includes a left designation (11) to indicate "17L" for runway 215.

According to one embodiment, reflectors 280 and 290 are disposed horizontally at ends 202 and 204 of runway 200 (e.g. front of the edge of runway 200). Alternatively, reflectors 280 and 290 can be disposed vertically. Although aircraft 10 preferably scans left to right, in other exemplary embodiments, aircraft 10 may scan in a right to left direction, a vertical direction or diagonal direction depending upon orientation of reflectors 295 and 298.

An exemplary bit code is summarized in the Tables I and II below.

TABLE I

Heading Bit Code

| Runway Heading | Bit code |
| --- | --- |
| 01 | 000001 |
| 02 | 000010 |
| 03 | 000011 |
| 04 | 000100 |
| 05 | 000101 |
| 06 | 000110 |
| 07 | 000111 |
| 08 | 001000 |
| 09 | 001001 |
| 10 | 001010 |
| 11 | 001011 |
| 12 | 001100 |
| 13 | 001101 |
| 14 | 001110 |
| 15 | 001111 |
| 16 | 010000 |
| 17 | 010001 |
| 18 | 010010 |
| 19 | 010011 |
| 20 | 010100 |
| 21 | 010101 |
| 22 | 010110 |
| 23 | 010111 |
| 24 | 011000 |
| 25 | 011001 |
| 26 | 011010 |
| 27 | 011011 |
| 28 | 011100 |
| 29 | 011101 |
| 30 | 011110 |
| 31 | 011111 |
| 32 | 100000 |
| 33 | 100001 |

TABLE I-continued

Heading Bit Code

| Runway Heading | Bit code |
|---|---|
| 34 | 100010 |
| 35 | 100011 |
| 36 | 100100 |

TABLE II

Right/Center/Left Designation

| None | Right | Left | Center |
|---|---|---|---|
| 00 | 01 | 11 | 10 |

The bit codes discussed herein are provided in an exemplary fashion only. Other types of symbology could be utilized including three level or four level codes. In addition, other types of parity and error checking bit patterns can be utilized. The order of the bit codes are provided in a exemplary fashion.

Figure 6:
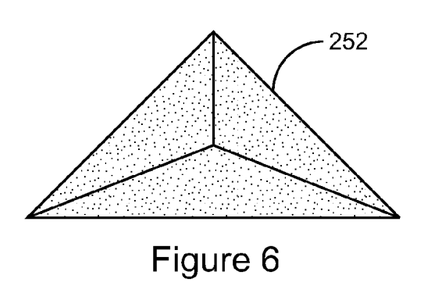
FIG. 6 is a perspective view schematic drawing of a radar reflector of a first size for use with the weather radar system illustrated in FIG. 3, according to an exemplary embodiment.
Figure 7:
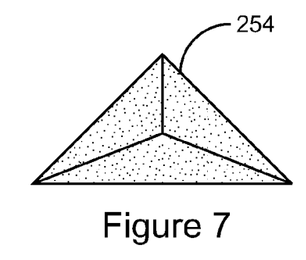
FIG. 7 is perspective view schematic drawing of a radar reflector of a second size for use with the weather radar system illustrated in FIG. 3, in accordance with an exemplary embodiment.

With reference to FIGS. 6 and 7, radar reflectors 252 and 254 can be utilized in sets of reflectors 280, 284, 286, 290, 295 and 298 described with reference to FIGS. 4 and 5. For example, reflector 252 can be a larger reflector representing a bit number 1, and reflector 254 can be a small reflector reflecting a bit 0.

Reflectors 252 and 254 are preferably corner reflectors made from a suitable radio reflective material. In one embodiment, reflectors 252 and 254 are made from a metal, such as, aluminum.

Reflectors 252 and 254 can be provided at the runway threshold. The use of such reflectors allows the radar antenna to receive a signal so that end points of the runway can be determined and utilized by determining the range to reflectors 280 and 290. Alternatively a separate reflector or set of reflectors can be used to mark the runway threshold. Radar range analysis can be performed to determine the range to the corner reflector situated at the end of the runway 202.

In the preferred embodiment, reflectors 252 and 254 are corner reflectors having a pyramidal or triangular shape. In a preferred embodiment, reflectors 252 and 254 are open faced pyramidal/triangular systems configured so that a beam that strikes the reflector bounces directly back to the sender across a large range of incident angles. Reflectors 252 and 254 are preferably sized so that a difference of energy is reflected off each so that a 1 and 0 can be easily distinguished. In one embodiment, reflector 252 has twice the surface area of reflector 254. In another embodiment, reflector 252 has a surface area three times the surface area of reflector 254.

Alternatively, system 300 can be replaced with a light-based sensor system. Such a system can utilize light waves and reflectors. In such an embodiment, reflectors 252 and 254 can be mirrors or other reflective optics (e.g., laser reflectors, corner reflectors, etc.) The light waves can be provided by sources on top of aircraft 10, such as lasers and optical sensors (e.g., cameras), which can be utilized to receive a code of light provided by optical reflectors. The non-laser light sources would preferably utilize a lensing system, such as a Fresnel lens to provide a narrow beam. According to one embodiment, infrared lights could be utilized which could be read by an infrared camera.

Alternatively, reflectors 252 and 254 can be configured as planar reflectors. However, planar reflectors do not necessarily provide reflections of light or radar beams directly back to the transmitter. Alternatively, parabolic and spherical reflectors can be utilized. Alternatively, a horn antenna could be utilized instead of reflectors 252 and 254 to provide a radio broadcast. The radio broadcast would be received by an antenna on aircraft 10.

Figure 8:
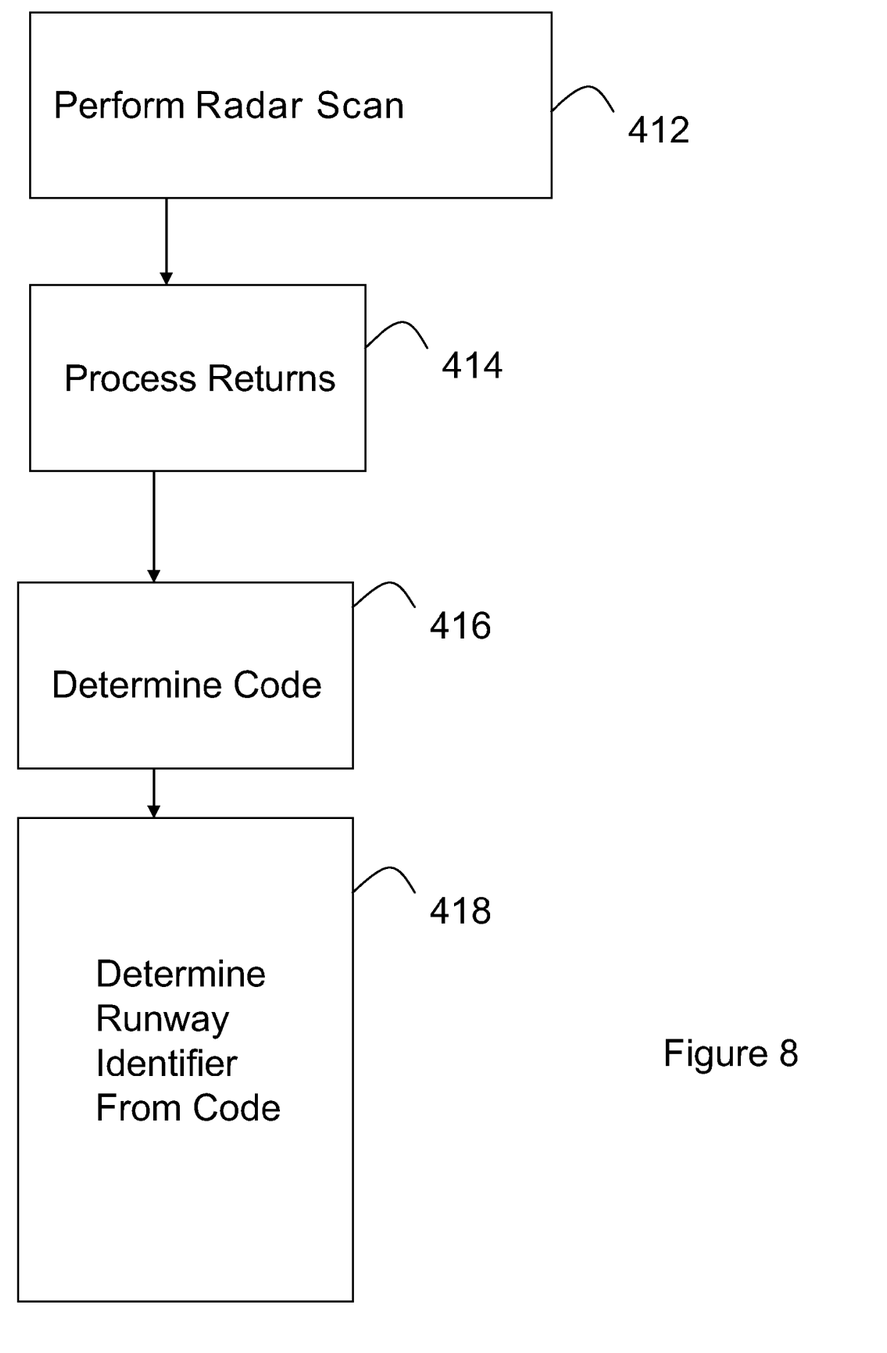
FIG. 8 is a flow diagram showing operation of the weather radar system illustrated in FIG. 3 according to an exemplary embodiment.

With reference to FIG. 8, system 300 performs a radar scan at a step 412. Preferably, the radar scan is provided in a horizontal direction to read set of symbols 295 at an end 204 of runway 202. The scan can be performed as part of a weather radar scan or as a dedicated scan during approach. The scan can be a horizontal scan performed at a range of an angle pointing toward runway 202. Preferably, the scan is in a direction corresponding to the heading of aircraft 10. In one embodiment using phase of flight information, the radar system 300 automatically scans for the presence of reflectors 290 in response to approach.

At a step 414, radar returns are processed and patterns of returned energy are analyzed to detect a presence of a code. At a step 416, electronics 22 determines a code associated with the process returns. At a step 418, a runway identifier code is determined and displayed on displays 20 or display 25.

In a preferred embodiment, the bit level is determined by the energy returned from the beam. Significantly greater energy in a small area is associated with the presence of a reflector. Various thresholds can be utilized to determine a bit level from the reflectors. Areas of high levels of reflected energy is compared to each other to determine if the bit code is a 1 or a 0. If the energy is significantly greater than the other type of symbol, then it is considered a 1. If the energy is significantly less, then it is considered a 0. Since the reflectors are disposed near each other, measurements of the distance can be utilized to determine if a bit level is authentic. Range to reflectors 252 and 254 can also be used to authenticate the bit code. The energy from reflectors 252 and 254 is generally significantly more concentrated than reflectors associated with ordinary ground contacts and weather.

Figure 9:
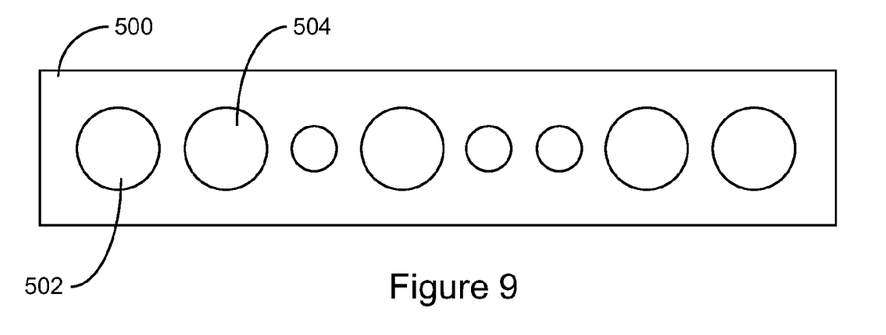
FIG. 9 is a planar front view schematic drawing of electromagnetic sources for providing a runway identification code in accordance with another exemplary embodiment.

With reference to FIG. 9, aircraft 10 can be equipped with a receiver for receiving electromagnetic energy associated with electromagnetic sources 502 and 504. Similar to the set of reflectors 290 (FIG. 4), sources 502 and 504 are arranged in a set 500 for providing a code indicative of runway identification. The code can be implemented by amplitude of electromagnetic radiation coming from larger sources 504 and smaller sources 502. Alternatively, the wavelengths of electromagnetic radiation can be utilized to provide the code. In one embodiment, sources 502 and 504 of electromagnetic energy are lasers or lamps. The lamps can be in the visible light range or in the infrared light range. Fresnel lenses or other optical devices can be utilized to narrow the beam associated with sources 502 and 504 to prevent interference. In another embodiment, electromagnetic sources 502 and 504 can be audio sources for providing an audio code for runway identification on the aircraft 10 is equipped with an audio receiver.

Although specific steps are shown and described in a specific order, it is understood that the method may include more, fewer, different, and/or a different ordering of the steps to perform the function described herein.

The exemplary embodiments illustrated in the figures and described herein are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the runway identification system as shown in the various exemplary embodiments is illustrative only. Although only a few embodiments of the present application have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors and orientations) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application as defined in the appended claims. The order or sequence of any process or method steps may be varied or re-sequenced according to alternative embodiments. In the claims, any means-plus-function clause is intended to cover the structures described herein as performing the recited function and, not only structural equivalents, but also equivalent structures. Other substitutions, modifications, changes and omissions may be made in the design, operating conditions and arrangement of the exemplary embodiments without departing from the scope of the present application as expressed in the appended claims.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store a desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machine to perform a certain function or group of functions.

It should be noted that although the diagrams herein may show a specific order of method steps, it is understood that the order of these steps may differ from what is depicted. Also, two or more steps may be performed concurrently or with partial concurrence. Such variation will depend on the software and hardware systems chosen. It is understood that all such variations are within the scope of the application. Likewise, software implementations of the present application could be accomplished with standard programming techniques with rule-based logic and other logic to accomplish the various connection steps, processing steps, comparison steps and/or decision steps.

The foregoing description of embodiments of the application has been presented for purposes of illustration and description. It is not intended to be exhaustive or to limit the application to the precise form disclosed, and modifications and variations are possible in light of the above teachings, or may be acquired from practice of the application. The embodiments were chosen and described in order to explain the principles of the application and its practical application to enable one skilled in the art to utilize the application in various embodiments and with various modifications as are suited to the particular use contemplated.

Although the description contains many specificities, these specificities are utilized to illustrate some of the preferred embodiments of this application and should not be construed as limiting the scope of the application. The scope of this application should be determined by the claims, their legal equivalents, and the fact that it fully encompasses other embodiments which may become apparent to those skilled in the art.

What is claimed is:

1. A runway identification system, comprising:
a weather radar system comprising a processor and an antenna, the weather radar system configured to transmit a radar signal and receive radar returns, wherein the radar returns are processed to determine a runway identification based upon a reflection from a set of reflectors, the runway identification including a number representing a runway heading of the runway the number being a physical numerical representation derived from the reflection of the radar signal.

2. The runway identification system of claim 1, wherein the set of the reflectors comprise at least one of corner reflectors, laser reflectors, or other reflective optics.

3. The runway identification system of claim 1, wherein the reflectors are arranged in an arrangement configured to provide the reflection as representing a binary number representing the runway identification.

4. The runway identification system of claim 1, wherein a pattern associated with the set of runway reflectors provides the runway identification and the reflection being according to the pattern and the reflection including a first portion indicating the runway heading and a second portion indicating a left, right or center designation.

5. The runway identification system of claim 4, wherein the first portion is a 6 bit number.

6. The runway identification system of claim 5, wherein the second portion is a 2 bit number.

7. The runway identification system of claim 4, wherein the reflection includes a third portion for error checking.

8. The runway identification system of claim 1, wherein the processor causes the runway identification to be displayed on a flight display.

9. The runway identification system of claim 1, wherein the weather radar system performs a horizontal radar sweep to obtain the radar returns.

10. The runway identification system of claim 9, wherein the reflectors comprise eight reflectors, wherein the reflectors comprise at least a first size and a second size, the first size being smaller than the second size.

11. A method of runway identifying utilizing a set of corner reflectors located in proximity to an end of a runway, the method comprising:

receiving electromagnetic returns from a beam directed toward the set of corner reflectors;
  determining a runway identification from the electromagnetic returns; and
  displaying the runway identification, the runway identification including a number representing a runway heading of the runway.

12. The method of claim 11, wherein the set of reflectors are arranged to reflect a binary code representing the runway identification.

13. The method of claim 11, wherein the runway identification is displayed on the primary flight display.

14. The method of claim 11, further comprising automatically providing the beam during approach.

15. The method of claim 14, wherein the beam is provided as part of a horizontally scanned weather radar beam.

16. A runway identification system for an airport including a runway, the runway identification system comprising:

a set of runway corner reflectors, the set of runway corner reflectors configured to reflect a radar beam from an aircraft, the beam being reflected to indicate a code representing an identification of the runway, the identification of the runway including a number representing a runway heading of the runway.

17. The runway identification system for an airport of claim 16, the corner reflectors comprise a first sized reflector and a second sized reflector.

18. The runway identification system for an airport of claim 17, wherein the code is a binary code associated with a particular arrangement of the set of runway corner reflectors, wherein the first sized reflector represents a 0 and the second sized reflector represents a 1.

19. The runway identification system for an airport of claim 17, wherein the system comprises an aircraft weather radar system for providing the radar beam as a weather radar beam.

20. The runway identification system of claim 16, wherein the code is associated with a particular arrangement of the set of runway corner reflectors and represents a number from 1 to 35, a left, right, or center indication, and a parity bit.

* * * * *